(12) United States Patent
D'Angelo et al.

(10) Patent No.: US 11,430,144 B2
(45) Date of Patent: Aug. 30, 2022

(54) DEVICE AND PROCESS FOR THE CONTEMPORARY CAPTURE OF STANDARD IMAGES AND PLENOPTIC IMAGES VIA CORRELATION PLENOPTIC IMAGING

(71) Applicant: UNIVERSITA' DEGLI STUDI DI BARI ALDO MORO, Bari (IT)

(72) Inventors: Milena D'Angelo, Bari (IT); Augusto Garuccio, Bari (IT); Francesco Vincenzo Pepe, Bari (IT); Ornella Vaccarelli, Mola di Bari (IT)

(73) Assignee: UNIVERSITA' DEGLI STUDI DI BARI ALDO MORO, Bari BA (IT)

( * ) Notice: Subject to any disclaimer, the term of this patent is extended or adjusted under 35 U.S.C. 154(b) by 217 days.

(21) Appl. No.: 16/646,712

(22) PCT Filed: Sep. 26, 2017

(86) PCT No.: PCT/IB2017/055842
§ 371 (c)(1),
(2) Date: Mar. 12, 2020

(87) PCT Pub. No.: WO2019/064047
PCT Pub. Date: Apr. 4, 2019

(65) Prior Publication Data
US 2020/0410706 A1    Dec. 31, 2020

(51) Int. Cl.
*G06T 7/557* (2017.01)
*G02B 27/00* (2006.01)

(52) U.S. Cl.
CPC .......... *G06T 7/557* (2017.01); *G02B 27/0075* (2013.01); *G06T 2207/10028* (2013.01); *G06T 2207/10052* (2013.01)

(58) Field of Classification Search
None
See application file for complete search history.

(56) References Cited

U.S. PATENT DOCUMENTS 7,620,309 B2    11/2009    Georgiev
9,095,631 B2 *   8/2015    Colabufo ............. C07D 417/04
(Continued)

FOREIGN PATENT DOCUMENTS

CN    105807289    7/2016
EP      3220185    9/2017
(Continued)

OTHER PUBLICATIONS

International serch report and writen opinion issued by the EPO for PCT/IB2018/055856 dated Nov. 20, 2018.
(Continued)

*Primary Examiner* — Tahmina N Ansari
(74) *Attorney, Agent, or Firm* — RMCK Law Group PLC (57) ABSTRACT

A process and device for the plenoptic capture of photographic or cinematographic images are described, both based on the correlation measure or "Correlation Plenoptic Imaging" (CPI), comprising the steps of splitting a primary light beam (6) coming from at least one light source in at least two distinct light beams (7, 8), directing said distinct light beams towards two image capturing sensors to capture images, so that the first light beam is directed towards at least one first capturing sensor to capture a spatial measure of a scene and the second light beam is directed towards a second capturing sensor to capture an angular measure of said scene, said angular measure being adapted to provide the propagation direction of the light beam coming from the scene, said spatial measure being adapted to provide the conventional two-dimensional capture of the image of the scene. The device further comprises a main focal lens (Lb) arranged along the optical path of the first light beam, said
(Continued)

main focal lens (Lb) and second sensor (14) being arranged so that the length of the light's optical path between the light source (4) and the second sensor (14) is substantially equal to the length of the light's optical path between the light source (4) and said main focal lens (Lb).

16 Claims, 5 Drawing Sheets

(56) References Cited

U.S. PATENT DOCUMENTS

| | | | |
|---|---|---|---|
| 9,260,400 B2* | 2/2016 | Leopoldo | C07D 241/12 |
| 2010/0294916 A1 | 11/2010 | Meyers et al. | |
| 2020/0410706 A1* | 12/2020 | D'Angelo | G06T 7/557 |
| 2021/0118177 A1* | 4/2021 | Palmer | G06T 7/557 |
| 2021/0318532 A1* | 10/2021 | D'Angelo | H04N 5/22541 |
| 2021/0368154 A1* | 11/2021 | D'Angelo | H04N 13/122 |

FOREIGN PATENT DOCUMENTS

| | | | | |
|---|---|---|---|---|
| EP | 3220185 A1 * | 9/2017 | | H04N 13/232 |
| EP | 17160543.9 | 9/2017 | | |
| IT | 102016000027106 | 3/2016 | | |
| WO | WO-2019064047 A1 * | 4/2019 | | G02B 27/0075 |

OTHER PUBLICATIONS

Jeffrey H Shapiro: "Computational Ghost imaging", arxiv.org, Cornell University Library, 201 Olin Library Cornell University Ithaca, NY 14853, Jul. 16, 2008 (Jul. 16, 2008), XP080427095, DOI: 10.1103/PHYSREVA.78.061802 Cornell University.

Francesco V Pepe et al: "Correlation plenotropic imaging with entangled photons", Arxiv. Org, Cornell University Library, 201 Olin Library Cornell University Ithaca, NY 14853, Jun. 7, 2016 (Jun. 7, 2016) XP080706501, DOI: 10.3390/TECHNOLOGIES4020017.

Francesco V Pepe et al: "Exploring plenoptic properties of correlation imaging with chaotic light", Arxiv. Org, Cornell University Library, 201 Olin Library Cornell University Ithaca, NY 14853, Oct. 6, 2017 (Oct. 6, 2017) XP080826623, DOI: 10.1088/2040-8986/AA7B0D.

Milena D'Angelo et al: "Correlation plenoptic imaging", Physical Review Letters, vol. 116, No. 22, Jun. 1, 2016 (Jun. 1, 2016), XP055317060, US ISSN: 0031-9007, DOI: 10.1103/PhysRevLett.116.223602.

* cited by examiner

DEVICE AND PROCESS FOR THE CONTEMPORARY CAPTURE OF STANDARD IMAGES AND PLENOPTIC IMAGES VIA CORRELATION PLENOPTIC IMAGING

This application is a U.S. national stage of PCT/IB2017/055842 filed on 26 Sep. 2017, the content of which is incorporated herein by reference in its entirety.

FIELD OF THE INVENTION

The object of the present invention is a plenoptic image capturing technique to capture images in the field of photography, cinematography, microscopy and stereoscopy.

In particular, the plenoptic shooting process according to the present invention is named "Correlation Plenoptic Imaging" (CPI), i.e. it refers to a plenoptic capture of images based on the spatio-temporal correlation of light intensities recorded by sensors arranged so as to capture the spatial and angular measures of the image.

KNOWN PREVIOUS ART

"Plenoptic capture of images" means a particular optical process allowing the capture of both the location and the propagation direction of light in a given scene. In this way, a spatial measure and an angular measure can be obtained, which together allow a three-dimensional reconstruction of the captured image.

In fact, in a step of processing the captured image it is possible, for example, either to change the position of the focal plane of the image or to extend the depth of field of the image.

The currently known conventional technique to capture images allows the magnification, the position of the focal plane and the depth of field to be selected by means of suitable lenses positioned upstream of the image capturing sensor.

However, the conventional technique to capture images has the limit of providing a two-dimensional representation of an originally three-dimensional scene. The three-dimensional representation of images is useful in a variety of technical applications, such as those relating to the modeling of components to be used in virtual simulation environments, or those relating to the representation of objects aiming at prototyping, design, production, marketing, inspection and maintenance, or those generally relating to an improved representation of an object of a three-dimensional scene, so as to ensure improved experiences for the user and more realistic results.

Furthermore, with the conventional technique to capture images, neither the position of the focal plane nor the depth of field can be changed at a later time after capturing of the image. Very frequently, in photography field, there is the need to focus a particular plane or to select the depth of field of the scene of the image at a later time after the capture.

Therefore, the purpose of the plenoptic image capturing technique is to solve many drawbacks of the conventional technique to capture images.

The currently known plenoptic image capturing technique allows the obtainment of images having different focal planes in different positions of the three-dimensional space of the image of the scene. This characteristic is possible thanks to the capture of both spatial and angular measures of the image. "Spatial measure" means the conventional two-dimensional capture of the scene image, whereas "angular measure" means the capture of the information required to determine the (angular) propagation direction of the light beam coming from the scene to be captured. In a processing step following the capture of the image, the spatial measure and the angular one can be combined so as to reconstruct a three-dimensional image.

The currently known plenoptic image capturing technique is based on inserting a microlens array arranged between a main lens adapted to focus the image on the microlens array, and a sensor adapted to capture the image of a given scene. The microlens array has a double function. On the one hand, it acts as a dot array adapted to capture the spatial measure of the scene, on the other, it reproduces on the sensor a sequence of images of the main lens (one per each microlens), thus providing the angular measure of the scene.

Unlike the conventional technique to capture images, a device for the plenoptic capture of images (plenoptic imaging device) captures light beams instead of dot or "pixels" of information. This means that in processing an image, different perspectives or views of the scene can be obtained, thus allowing the user to select the focused plane of the scene and the depth of field after the capture of the image, to obtain a three-dimensional reconstruction of the scene, or to produce one or more views of the same scene after the capture of the single image.

However, the drawback of the currently known plenoptic image capturing technique is to produce low-resolution images. In fact, unlike conventional devices for capturing images, the currently known plenoptic image capturing technique provides for the use of a single sensor for simultaneously capturing spatial and angular measures of the scene. This characteristic limits the spatial resolution of the captured image in that part of the resolution capability of the sensor is sacrificed for the angular measure. Furthermore, in the currently known plenoptic image capturing technique, inverse proportionality links the maximum spatial and angular resolutions, the inverse proportionality being ascribable to the use of a single sensor to obtain both spatial and the angular measures. Therefore, low resolution is a drawback of the images produced by known devices for the plenoptic capture of images, i.e. they are characterized in that the resolution of the images is well below the resolution given by the diffraction limit.

The document U.S. Pat. No. 7,620,309 describes a device for the plenoptic capture of images (plenoptic imaging device) comprising a conventional main lens and a digital image capturing sensor CCD (Charge Coupled Device) to digitally capture images. The described device also comprises a microlens array arranged between the scene to be captured and the main lens of the device. Therefore, unlike other currently known devices for the plenoptic capture of images, in which starting from the external scene light rays propagate first through the main lens, then through the microlens array, to be finally captured by the CCD sensor, document U.S. Pat. No. 7,620,309 describes a device in which the position of the main lens is exchanged with that of the microlens array. Furthermore, by decreasing the number of microlenses, a reduced number of high-resolution images can be captured instead of a high number of low-resolution images, as is the case for the other prior art plenoptic devices. After detecting the image, an image processing device designed to obtain a large number of high-resolution images from the reduced number of high-resolution captured images can be used, as above described. However, the capturing device described in U.S. Pat. No. 7,620,309 is not able to simultaneously increase the resolution of captured images and the number of original views of the scene to be captured. In fact, a high number of views can be obtained only by means of an interpolation process following the capture of the scene image. Furthermore, the document U.S. Pat. No. 7,620,309 does not solve the fundamental problem of the currently known devices for the plenoptic capture of images, i.e. the maximum spatial and angular resolutions being inversely proportional due to the use of a single sensor to obtain both the spatial and the angular measures. In other words, if a microlens array for capturing the spatial and angular measures of the scene is still used, then the spatial and angular resolutions of the reproduced image are still coupled. The coupling of the spatial and angular resolutions results in the production of many low-resolution views or few high-resolution views, but never in the production of a large number of original high-resolution views.

Therefore, as evident, it is disadvantageous not be able to decouple the resolutions of spatial and angular measurements of the captured image, which would provide images having not only a high number of views, but also high resolution.

A further problem of the plenoptic capturing devices of the known art, is the poor achievable depth of field. This type of problem and the low angular resolution of the captured image are closely correlated, because the angular resolution is linked to the number of focused views that can be captured in a single plenoptic image, and therefore to the depth of field of the image.

A further problem of the plenoptic image capturing technique of the known art, is the technique for processing the captured image, according to which technique the position of the focal plane within the image scene can be adjusted through a focal rescaling process. However, the focal rescaling process of the prior art is limited by low angular resolution, because the maximum number of views that can be used during the focal rescaling process is limited by the angular resolution of the plenoptic capturing device.

A solution to the aforementioned problems of the known art is described in Patent Applications IT102016000027106 and EP17160543.9, in the name of the present Applicant. In these documents, a process and device for the plenoptic capture are described, both based on the correlation measure or "Correlation Plenoptic Imaging" (CPI), wherein a primary light beam coming from at least one light source is split in two distinct light beams that are directed respectively towards a first capturing sensor to capture the angular measure and towards a second capturing sensor to capture the spatial measure. Although by this solution high-resolution plenoptic images having high maximum depth of field can be obtained, on the other side this solution does not allow real-time monitoring of the scene of interest during capturing. This problem is due to the fact that the first sensor captures the image of the light source, while the second sensor captures the image (second-order or "ghost" image) of the scene as a result of measuring correlations between the two sensors, i.e. as a result of multiple captures by both sensors.

Another limitation of this scheme is that the image resolution of the scene of interest is defined by the numerical aperture of the light source which could be difficult to be controlled and optimized.

OBJECTS OF THE INVENTION

Object of the present invention is to solve the above-mentioned problems of the known prior art and to provide a process for the plenoptic capture of images (plenoptic imaging process) based on the correlation measure, i.e. a process of "Correlation Plenoptic Imaging" (CPI), which provides high resolution of the captured images and real-time monitoring of the scene of interest during capture.

In other words, object of the present invention is to provide a process for the plenoptic capture of images (plenoptic imaging process) based on the correlation measure, the process allowing the simultaneous capture of both standard and plenoptic images whose direct resolution is the maximum resolution allowed by the diffraction limit.

It is a further object of the invention to provide a process for the simultaneous capture of both standard and plenoptic images (plenoptic capturing process) allowing a high maximum depth of field to be obtained without compromising spatial resolution.

Another object of this invention is to provide an image processing method of focal rescaling, which allows an image previously captured outside the focal plane to be focused. This object is linked to the resolution of the captured plenoptic images, because the quality of a plenoptic focal rescaling depends on the angular resolution of the captured plenoptic image.

Another object of the present invention is to provide a "Correlation Plenoptic Imaging" (CPI) device allowing the obtainment of high resolution of the captured images, i.e. captured images whose resolution is the maximum resolution allowed by the diffraction limit, allowing real-time monitoring of the scene to be captured and allowing simultaneously the obtainment of high maximum depth of field as well as focal resealing, the latter allowing an image previously captured outside the focal plane to be focused.

SUMMARY OF THE INVENTION

These and other objects of the present invention are achieved through a process for the plenoptic capture of photographic, cinematographic, microscopic or stereoscopic images of a scene, the process being based on the correlation measure and comprising the following steps.

Splitting a primary light beam coming from at least one light source in a first light beam and a second light beam through a splitting element (for example a beam splitter), wherein the first light beam is adapted to be either reflected by the scene or transmitted through the scene.

Directing the first light beam and the second light beam respectively towards first sensor means to capture a spatial measure of the scene and towards second sensor means to capture an angular measure of the scene. The aforesaid angular measure is adapted to provide the propagation direction of the first light beam reflected by the scene of transmitted through the scene, whereas the aforesaid spatial measure is adapted to provide the image of the scene.

According to an aspect of the present invention, the first light beam is passed through a main focal lens arranged along the light's optical path between the scene and the first sensor means. The aforesaid main focal lens and the second sensor means are further arranged so that the length of the light's optical path between the light source and the second sensor means is substantially equal to the length of the light's optical path between the light source and the main focal lens.

Thanks to the particular positioning of the main focal lens and the second sensor means with respect to the light source, the second-order image (or "ghost image") of the main focal lens is on the second sensor means and the first-order image of an object of the scene is on the first sensor means.

In other words, the second-order image of the main focal lens is captured by the second sensor means for the angular-measure capturing, whereas the first-order image of an object of the scene is captured by the first sensor means for the spatial-measure capturing.

Therefore, the present invention allows real-time monitoring of the object of the scene during the plenoptic capture of the scene.

Preferably, the method further provides the step of processing the spatial measure and the angular measure respectively captured by the first sensor means and the second sensor means by a correlating process to correlate the spatial measure and the angular measure for obtaining a plenoptic image.

By capturing the spatial and angular measures of the light beams in a given scene, the user can select both the plane of the focused scene and the depth of field after the capture of the image. In this way a three-dimensional reconstruction of the scene can be obtained, or else one or more views of the same scene can be produced after the capture of a single image.

By splitting the light beams in at least two distinct beams according to the present invention, the decoupled spatial and angular measures of light beams can be captured. Advantageously, in this way the inverse proportionality dependence existing between spatial and angular resolution in plenoptic devices of known art can be decoupled, thereby increasing the angular resolution value without changing the spatial resolution, and vice versa.

Advantageously, by the capturing CPI process according to the present invention, high resolution of the images captured by a plenoptic device can be obtained, in particular the resolution of images is the maximum resolution allowed by the diffraction limit. Advantageously, image resolution is determined by the numerical aperture of the main focal lens, which numerical aperture can be easily controlled and optimized so as to be close to 1. The image resolution achieved by the process of the present invention is not only actually competitive with the resolution of common standard imaging systems known in the art, but is also higher than the maximum image resolution achievable by plenoptic imaging devices and CPI devices of the known art.

Furthermore, the plenoptic capturing CPI process according to the present invention provides a linear dependence relation between the spatial resolution $N_x$ and the angular resolution $N_u$ according to the expression $N_{tot}=N_x+N_u$, being $N_{tot}$ a fixed value of the maximum total resolution of the device. Advantageously, the linear dependence between the spatial resolution and the angular resolution allows the maximum spatial resolution to be not excessively penalized, the angular resolution value being equal, as instead happens in the plenoptic capturing devices of the known art.

Further object of the invention is a device for the plenoptic capture of photographic, cinematographic, microscopic or stereoscopic images of a scene, comprising first sensor means and second sensor means to capture images, and at least one splitting element (preferably a beam splitter) adapted to split a primary light beam coming from at least one light source in a first light beam directed towards the first sensor means and a second light beam directed towards the second sensor means.

The first light beam is adapted to be either reflected by the scene or transmitted through the scene, the first sensor means being designed to capture a spatial measure adapted to provide the scene image, the second sensor means being designed to capture an angular measure adapted to provide the propagation direction of the aforesaid first light beam either reflected by the scene or transmitted through the scene.

According to an aspect of the present invention, the device comprises a main focal lens arranged along the optical path of the first light beam between the scene and the first sensor means.

This main focal lens and the aforesaid second sensor means are arranged so that the length of the light's optical path between the light source and the second sensor means is substantially equal to the length of the light's optical path between the light source and the main focal lens.

Some embodiments may provide that the aforesaid first sensor means and the aforesaid second sensor means are two distinct image capturing sensors. As an alternative, further embodiments may provide that the first sensor means and the second sensor means are two distinct portions of an image capturing sensor.

Preferably, some embodiments provide for the use of splitting elements that allow the balance of the (average or maximum) intensities of the first and second light beams.

Further embodiments may preferably provide for the use of mirrors (or generally reflective elements) that allow the light beams to be directed in the most appropriate directions.

Advantageously, some embodiments of the device further comprise a second focal lens arranged along the optical path of the second light beam between the splitting element and the second sensor means.

If the light source includes a source of entangled photons, the device will be equipped with an additional focal lens that can be arranged either on the optical path of the second light beam (i.e., along the optical path between the splitting element and the second sensor means) or, alternatively, along the optical path of the first light beam (i.e., the optical path between the splitting element and the first sensor means).

An alternative embodiment may provide that the light source is a source of chaotic light made by means of a coherent-light source adapted to emit a coherent-light beam (for example a laser having high spatial and temporal coherence) and by means of a programmable device (for example a spatial light modulator (SLM)) producing, in the phase and amplitude of the beam of coherent light, variations that are known but each time different. The so-obtained beam of chaotic light is adapted to be either reflected by the scene or transmitted through the scene.

In this embodiment, both the splitting element and the second sensor means, together with all the possible optical systems arranged therebetween, can be eliminated thanks to the fact that both the statistics and development over time of the chaotic source can be known and that the expected propagation of a secondary virtual beam from the source to any virtual plane can be calculated via software and that the light intensity over time, that would be measured by second sensor means for the angular measure if these were placed on that virtual plane, can be calculated. The correlation between the intensity (or the intensity fluctuation) measured by the first sensor means, and the software-provided intensity expected for the secondary virtual light beam adapted to the angular measure, is calculated by a software.

In other words, further object of the present invention is a process for the plenoptic capture of photographic, cinematographic, microscopic or stereoscopic images of a scene, comprising the steps of:

emitting a first beam of chaotic light having known statistics by means of a light source, directing said first light beam towards first sensor means to capture a spatial measure of said scene, said first light beam being adapted to be either reflected by said scene or transmitted through said scene, said spatial measure being adapted to provide the image of said scene, calculating the spatio-temporal propagation of a second virtual light beam between the source and a virtual plane properly selected to capture an angular measure of said scene, said angular measure being adapted to provide the propagation direction of said first light beam reflected by said scene or transmitted through said scene, wherein said first light beam is passed through a main focal lens arranged along the light's optical path between said scene and said first sensor means, wherein said main focal lens is arranged so that the length of the light's optical path between said at least one light source and said main focal lens is substantially equal to the length of the light's optical path between said at least one light source and said virtual plane. Preferably, the light source comprises a source of coherent light and a spatial light modulator SLM or any other mode known per se in the art to produce chaotic light characterized by a known spatio-temporal development of the phase and amplitude of the field.

Similarly, further object of the present invention is a device for the plenoptic capture of photographic, cinematographic, microscopic or stereoscopic images of a scene, comprising a light source designed to emit a first chaotic light beam having known statistics, first sensor means to capture a spatial measure of said scene, said first light beam being adapted to be either reflected by said scene or transmitted through said scene, said spatial measure being adapted to provide the image of said scene. According to an aspect of the present invention, the device further comprises means for calculating the propagation of a second virtual light beam directed towards a virtual plane properly selected to capture an angular measure of said scene, said angular measure being adapted to provide the propagation direction of said first light beam reflected by said scene or transmitted through said scene. The device further comprises a main focal lens arranged along the light's optical path between said scene and said first sensor means, wherein said main focal lens is arranged so that the length of the light's optical path between said at least one light source and said main focal lens is substantially equal to the length of the light's optical path between said at least one light source and said virtual plane.

According to an aspect of the present invention, the light source is designed to produce chaotic light characterized by a known spatio-temporal development of the phase and amplitude of the field. Preferably, the light source comprises a source of coherent light and a spatial light modulator SLM.

BRIEF DESCRIPTION OF THE FIGURES

Further characteristics and advantages of the present invention will be more evident in the following description, given for illustrative purposes by referring to the attached figures, in which.

DETAILED DESCRIPTION OF THE FIGURES

Figure 1:
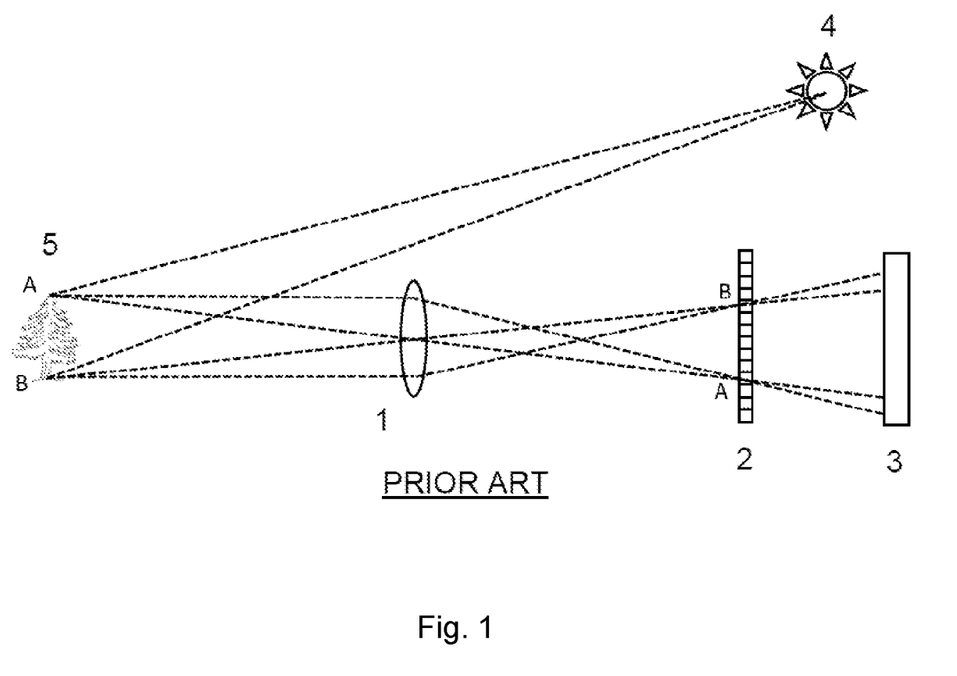
FIG. 1 shows a representative diagram of a device for the plenoptic capture of images according to the currently known art.

The plenoptic capture of images according to the currently known art is shown in the diagram of FIG. 1. A device adapted to capture plenoptic images is structured similarly to conventional cameras. The substantial difference distinguishing a plenoptic device from a conventional camera is that, in the known art plenoptic device shown in FIG. 1, there is a microlens array 2 located before the image capturing sensor 3. The light coming from a light source 4 illuminates an object 5 or a scene, thereby allowing the plenoptic device to capture light beams emitted by the light source 4 and reflected by the object 5 or the scene. The plenoptic device according to the currently known art comprises a main lens 1, a microlens array 2 and a capturing sensor 3 to digitally capture images, such as for example a CCD sensor.

In particular, the microlens array 2 is positioned on the focal plane of the image produced by the main lens 1. On the one hand, the image is refracted by the microlens array on the sensor located behind the array itself, thereby allowing the capture of the spatial measure of the scene; on the other hand, the microlens array reproduces on the sensor a number of the images of the main lens equal to the number of microlenses. Since the images produced by each portion of the main lens are reproduced with a slightly different perspective in accordance with the different angles the light beams have when they hit the microlenses, the microlens array also allows the angular capture of the scene.

This process for the plenoptic capture of images according to the currently known art allows the user to select the plane of the focused scene and the depth of field after the capture of the image, during a step of processing spatial and angular measures, thereby providing either a three-dimensional reconstruction of the scene or the making of one or more views of the same scene after the capture of the single image.

However, there is a wide gap between the spatial and angular resolutions of the image produced by means of the plenoptic capture process according to the currently known art. In particular, according to the known art, high spatial and angular resolutions of the captured image can not be simultaneously obtained. In fact, since the sensor 3 captures both the spatial and angular information of the image, the more available the angular resolution the more limited the spatial resolution.

The relationship between spatial resolution $N_x$ and angular resolution $N_u$ can be expressed by the law of inverse proportionality written in equation 1, in which $N_{tot}$ denotes a fixed value related to the total resolution of the sensor 3 of the plenoptic device.

$$N_{tot}=N_x \cdot N_u \qquad \text{Eq.1}$$

On the basis of the inverse proportionality relation stated in equation 1, $N_{tot}$ being a fixed value, the spatial resolution $N_x$ decreases as the angular resolution $N_u$ increases in accordance with the inverse proportionality.

On the contrary, the limitations the process for the plenoptic capture of images of known art is subjected to, can be overcome thanks to the plenoptic capture of images according to the present invention which provides a process and device of "Correlation Plenoptic Imaging" (CPI) wherein both standard and plenoptic high-resolution images can be captured.

Figure 2:
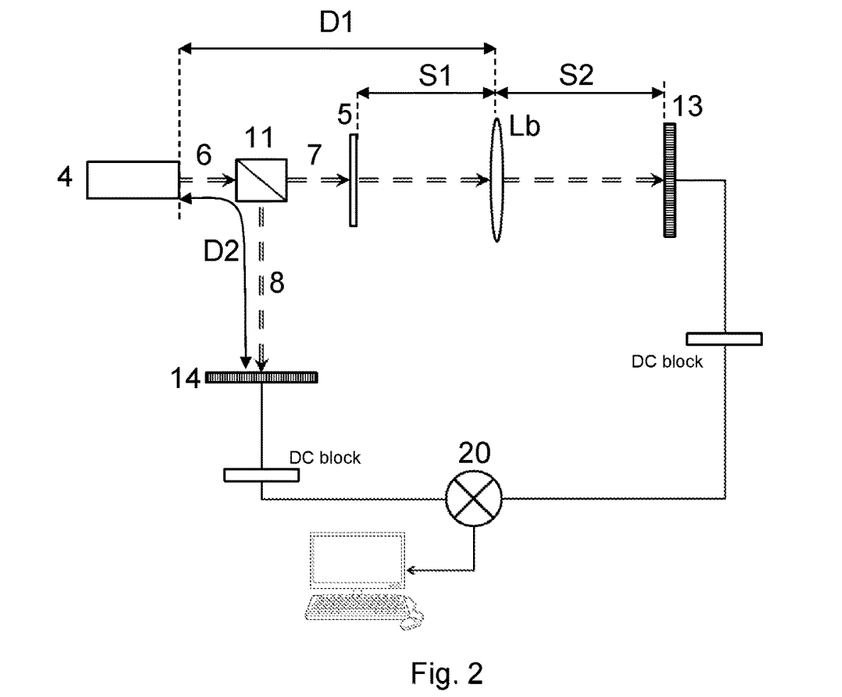
FIGS. 2-4 are representative diagrams of some possible embodiments of a device and method for the plenoptic capture of images according to the present invention wherein the light source is a source of chaotic light.

FIG. 2 shows a first embodiment of the CPI device for the plenoptic capture of images according to the present invention. The light coming from a light source 4 (for example a source of chaotic light) passes through a splitting element 11 able to split the primary light beam 6 emitted from the light source 4 in two distinct light beams 7, 8. "Primary light beam" means, for example, the totality of light rays coming from a light source. "Distinct light beams" means two or more light beams originated by an optical device such as the splitting element 11, starting from a single primary incident light beam. In particular, the so-originated distinct light beams have the same spatial and angular information; but lower intensity with respect to the primary incident light beam. Moreover, the sum of the intensities of the originated light beams is less than or equal to the intensity of the primary incident light beam. More particularly, the sum of the intensities of the originated light beams is equal to the intensity of the primary incident light beam if there is no dissipation of light energy inside the splitting element 11. An example of splitting element 11 is a "beam splitter" also known as "image splitter". This element may comprise, for example, at least two triangular prisms glued together to form a cubic element. The adhesion of at least two parts making up the splitting element is caused by a resin layer at their bases. The thickness of the resin layer is such that a portion of the primary incident light beam (first distinct beam) is transmitted through the transparent element, and at least another portion of the incident light beam (second distinct beam) is reflected at a certain angle. However, further types of beam splitters are known, consisting for example of a simple sheet, or "film" beam splitter, which can be used to implement the method and device of the present invention. In other words, the splitting element 11 splits the primary light beam 6 coming from the light source 4 in two distinct light beams 7, 8.

The embodiment shown in FIG. 2 provides that the first light beam 7, i.e. the light beam transmitted through the splitting element 11, is transmitted through the object 5 of the scene to be captured. For example, this embodiment can be used in microscopy to capture plenoptic images of a specimen 5 to be analyzed.

As will be described hereinafter, further embodiments may provide that the first light beam 7 is adapted to be reflected by the scene to be captured. Therefore, such embodiments can be employed in microscopy as well as, for example, for the capture of photographic or cinematographic images, still remaining within the protection scope of the present invention. Generally, the first light beam 7 is adapted to be either reflected by the scene or transmitted through the scene.

FIG. 2 also shows a main focal lens Lb of the CPI device according to the present invention. The first light beam 7, i.e. the light beam transmitted through the splitting element 11, illuminates the scene of the object 5, then is transmitted through the object 5 of the scene and finally is transmitted through the main focal lens Lb to reach a first capturing sensor. 13 to capture the spatial measure of the scene. The second light beam 8, i.e. the light beam reflected by the splitting element 11, is directed onto a second capturing sensor 14 to capture the angular measure of the scene.

The main focal lens Lb and the second sensor 14 are arranged so that the length of the light's optical path D2 between the light source 4 and the second sensor 14 is substantially equal to the length of the light's optical path D1 between the light source 4 and the main focal lens Lb (namely D1=D2).

Thanks to the particular positioning of both the main focal lens Lb and the second sensor 14, a second-order image (also called "ghost image") of the lens Lb on the second sensor 14 can be obtained by the correlation measure of the light intensities measured by the sensors 13 and 14.

In this way, the first sensor 13 reproduces the image of the object 5 through a direct measure of intensity, thereby allowing easy real-time monitoring of the object 5.

During monitoring, the focus plane of the first-order image on the first sensor 13 can be modified, for example in order to focus a part of object 5 (in case of a 3D object). In particular, the first-order image of the object 5 can be monitored with a desired focus plane selected for focusing the object 5, for example. In the latter case, the monitoring of the object 5 is carried out by arranging the first sensor 13 and the main focal lens Lb so as to meet the following equation:

$$1/S1+1/S2=1/f \qquad \text{Eq.2}$$

Where "S1" is equal to the length of the light's optical path between the main focal lens Lb and the object 5, "S2" is equal to the length of the light's optical path between the main focal lens Lb and the first sensor 13, and "f" is the focal length of the main focal lens Lb.

For example, if the device and the plenoptic capturing process are used for microscopic analyses of specimens, an embodiment of the device may provide that, for example, the light source 4 is fixed and the main focal lens Lb and the second sensor 14 are movable with respect to the light source 4, so as they simultaneously move by the same extent thus remaining equidistant from the light source 4. By moving the lens Lb with respect to the first sensor 13 so that it is brought to a distance S2 able to meet the equation 2 (Eq.2), the first-order image of the specimen 5 can be focused and properly monitored by the first sensor 13 during the plenoptic capture. Generally, once S1 and f have been set, an S2 equal to S2* able to meet the equation 2 (Eq.2) can be found.

In any case, as a result of the plenoptic capture of the image, either the focal plane can still be modified or the depth of field of the captured plenoptic image can be increased, for example in order to focus another subject of the scene or another part of the object 5 that was not focused during the monitoring.

Figure 3:
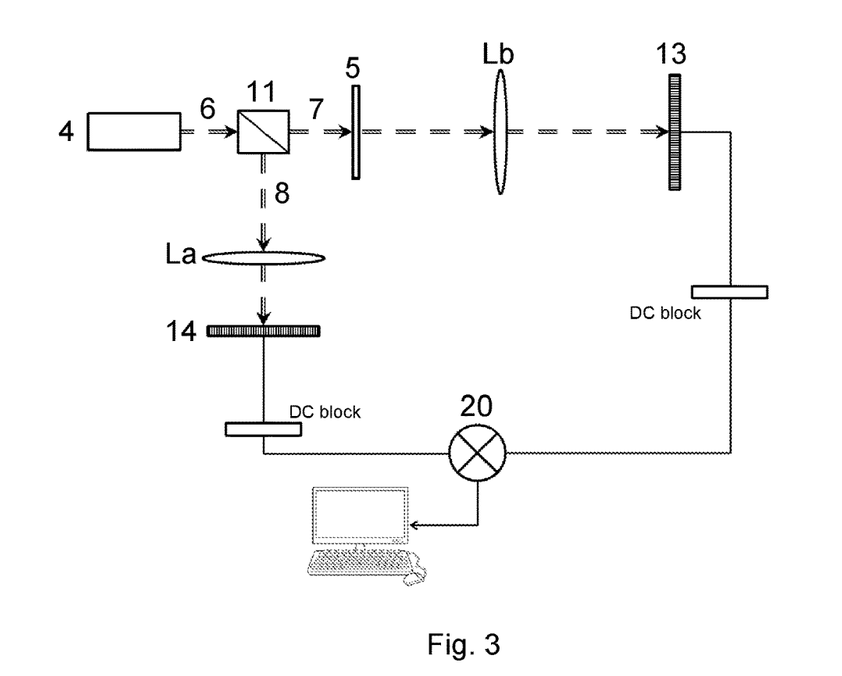

Referring to FIG. 3, the capturing device according to the present invention may comprise a second focal lens La arranged along the optical path of the second light beam 8 between the splitting element 11 and the second sensor 13. The second lens allows the magnification or reduction of the second-order image of the lens Lb on the second sensor 14.

Further embodiments (such as that shown in FIG. 4) provide that the first light beam 7 is adapted to be reflected by the object 5 of the scene. For example, these embodiments can be used for the capture of microscopic, photographic or cinematographic images.

Figure 4:
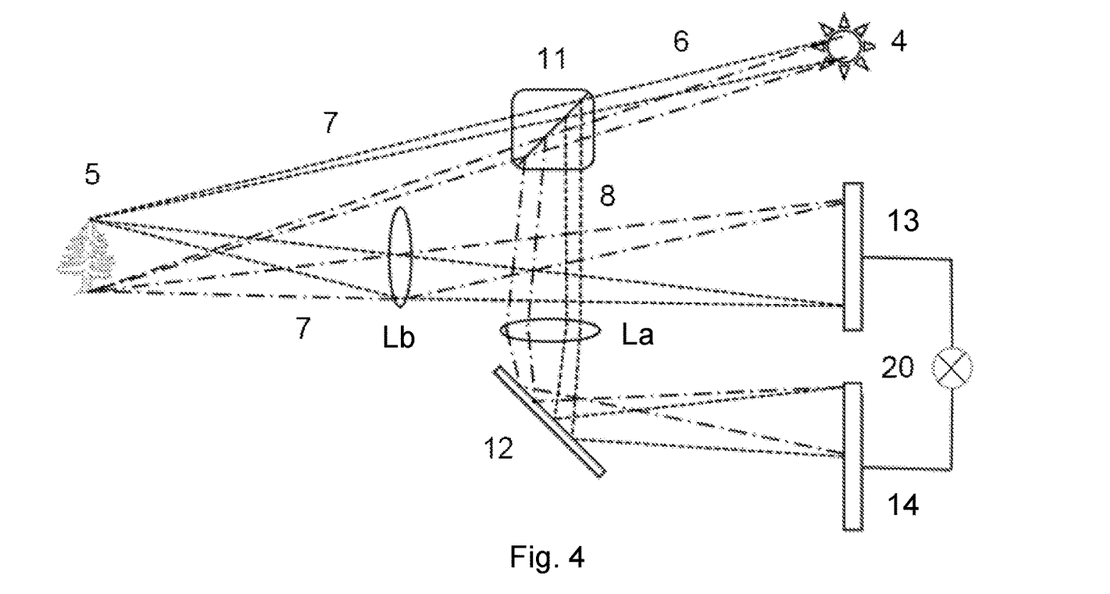

Referring to FIG. 4, the CPI device according to the present invention also comprises a reflective element 12 adapted to reflect the second light beam 8 and direct it towards the second sensor 14. In particular the second light beam 8, i.e. the light beam reflected by the splitting element 11, is directed onto the reflective element 12, for example a mirror, so as to converge on the second capturing sensor 14 to capture the angular measure.

The reflective element 12 allows the second light beam 8 to be directed towards the second sensor 14 which can be positioned substantially coplanar with the first sensor 13. An alternative embodiment (not shown in figures) may provide that the first light beam 7 and the second light beam 8 are directed onto two separate portions of a single image capturing sensor.

However, further embodiments may provide a reflective element 12 arranged so as to reflect and direct the first light beam 7 towards the first sensor means. In general, the use of at least one reflective element 12 adapted to direct the second light beam 8 towards the second sensor means 14, and/or at least one reflective element 12 adapted to direct the first light beam 7 towards the first sensor means 13, is provided.

As represented by the light rays depicted in FIG. 4, an alternative embodiment of the present invention provides that angular information of the scene could be retrieved by reproducing on the sensor 14 the first-order image of the light source 4 rather than the ghost image of the Lens Lb. Compared to the embodiments shown in FIG. 2 and FIG. 3, in this case the lens La is essential and is arranged so as to meet the following equation: $1/za+1/zb=1/F$, where za is the length of the light's optical path between the lens La and the light source 4, zb is the length of the light's optical path between the lens La and the second sensor 14, and F is the focal length of the lens La.

In general, the capturing process according to the present invention provides that the primary light beam 6 is split in two distinct light beams 7, 8 and that a first light beam 7 is directed onto first sensor means 13 and a second light beam 8 is directed onto second sensor means 14. Thus, the first and the second sensor means can be either two distinct sensors or two distinct portions of a single sensor.

If the two sensor means 13, 14 are distinct portions of a single sensor, it is preferable to balance the light intensities on the two sensor means 13, 14 in order to prevent a sensor means from having low signal-to-noise ratio, or vice versa, from being saturated when the signal-to-noise ratio of the other sensor means has been optimized. In this case, the splitting element 11 may comprise either a half-wave plate or a polarizer followed by a "polarizing beam splitter", or else an adjustable beam splitter, which allows the intensity of the transmitted beam to be modified with respect to the intensity of the reflected beam thereby achieving the balance of light intensities on the two sensor means 13, 14.

Generally, if the sensors 13 and 14 are portions of the same sensor, the splitting element 11 may be adjustable or, preferably, may be preceded by polarizing optical equipment (wave plates or polarizers) and more preferably it may be a polarizing beam splitter.

A further embodiment (not shown in figures) may provide that the light source 4 is a source of chaotic light made by means of a coherent-light source adapted to emit a coherent-light beam (for example a laser having high spatial and temporal coherence) and by means of a programmable device (for example a spatial light modulator (SLM)) producing variations that are known but each time different in the phase and amplitude of the beam of coherent light. The so-obtained beam of chaotic light is adapted to be either reflected by the scene or transmitted through the scene. In this embodiment, both the splitting element 11 and the second sensor means 14, together with all the possible optical systems arranged therebetween, can be eliminated thanks to the fact that both the statistics and development over time of the chaotic source can be known and that the expected propagation of a secondary virtual beam from the source to any virtual plane can be calculated via software and that the light intensity over time, that would be measured by second sensor means 14 for the angular measure if these were placed on that virtual plane, can be calculated. Therefore, the correlation between the intensity (or the intensity fluctuation), measured by the first sensor means 13, and the software-provided intensity expected for the secondary virtual light beam adapted to the angular measure, is calculated by a software.

In other words, in this embodiment, the process for the plenoptic capture of photographic, cinematographic, microscopic or stereoscopic images of a scene, comprises the steps of:

emitting a first beam of chaotic light having known statistics by means of a light source 4;

directing the first light beam towards first sensor means 13 to capture a spatial measure of the scene, wherein the first light beam is adapted to be either reflected by the scene or transmitted through the scene, and wherein the aforesaid spatial measure is adapted to provide the image of the scene;

calculating the propagation direction of a second virtual light beam directed towards a virtual plane properly selected to capture an angular measure of the scene, wherein the aforesaid angular measure is adapted to provide the propagation direction of the first light beam reflected by the scene or transmitted through the scene;

Therefore, the process provides that the first light beam is passed through a main focal lens Lb arranged along the light's optical path between the scene and the first sensor means 13. This main focal lens Lb is arranged so that the length of the light's optical path between the light source 4 and the main focal lens Lb is substantially equal to the length of the light's optical path between the light source 4 and the virtual plane on which the software calculates the intensity (or the intensity fluctuations) point by point, as time changes. Preferably, the light source 4 comprises a source of coherent light and a spatial light modulator SLM.

Similarly, the device for the plenoptic capture of photographic, cinematographic, microscopic or stereoscopic images of a scene, according to an alternative embodiment of the present invention, comprises a light source 4 designed to emit a first beam of chaotic light having known statistics, first sensor means 13 to capture a spatial measure of the scene, wherein the aforesaid first light beam is adapted to be either reflected by the scene or transmitted through the scene, and wherein the aforesaid spatial measure is adapted to provide the image of the scene.

According to an aspect of the present invention, this embodiment further comprises means for calculating the spatio-temporal propagation of a second virtual light beam directed towards a virtual plane to capture an angular measure of the scene, said angular measure being adapted to provide the propagation direction of said first light beam reflected by said scene or transmitted through said scene. The device further comprises a main focal lens Lb arranged along the light's optical path between said scene and said first sensor means 13, wherein said main focal lens Lb is arranged so that the length of the light's optical path between said at least one light source 4 and said main focal lens Lb is substantially equal to the length of the light's optical path between said at least one light source 4 and said properly-selected virtual plane. Preferably, the light source 4 comprises a source of coherent light and a spatial light modulator SLM. Preferably, the means to calculate the propagation direction of the second light beam may comprise, for example, a computer (for example a PC) designed to simulate the propagation of the second virtual light beam which is directed towards the virtual plane arranged at a given distance from the light source. The propagation of the second virtual beam is then simulated according to the known statistics of the first light beam (for example depending on the phase and amplitude variations imposed to the incident beam of coherent light by the spatial modulator).

Figure 5A:
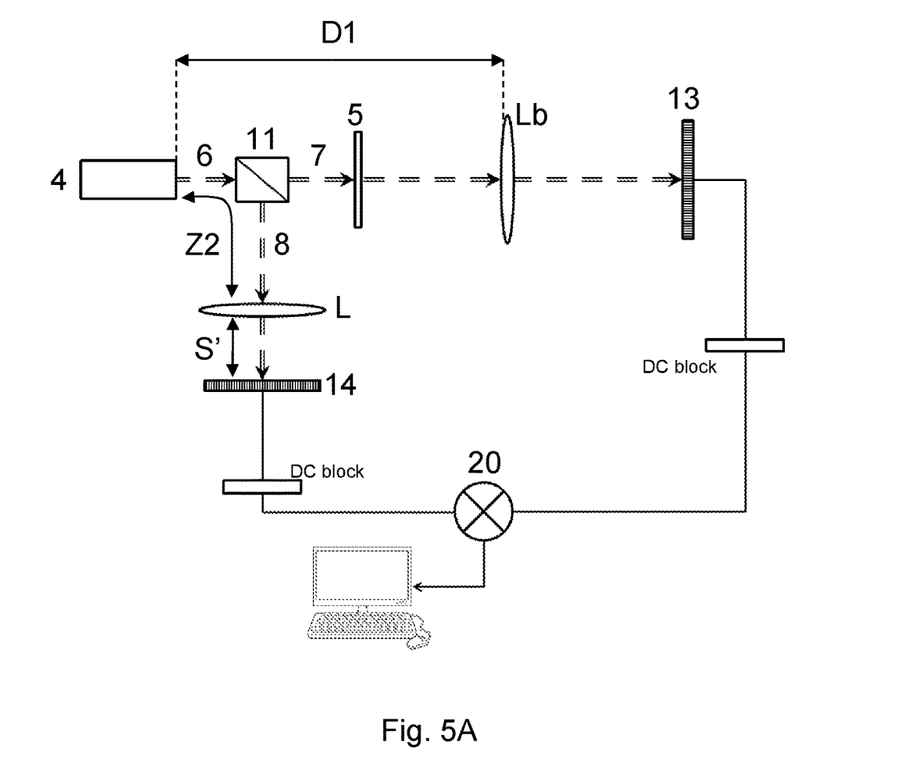
FIGS. 5A and 5B are representative diagrams of some possible embodiments of a device and method for the plenoptic capture of images according to the present invention wherein the light source is a source of entangled photons.
Figure 5B:
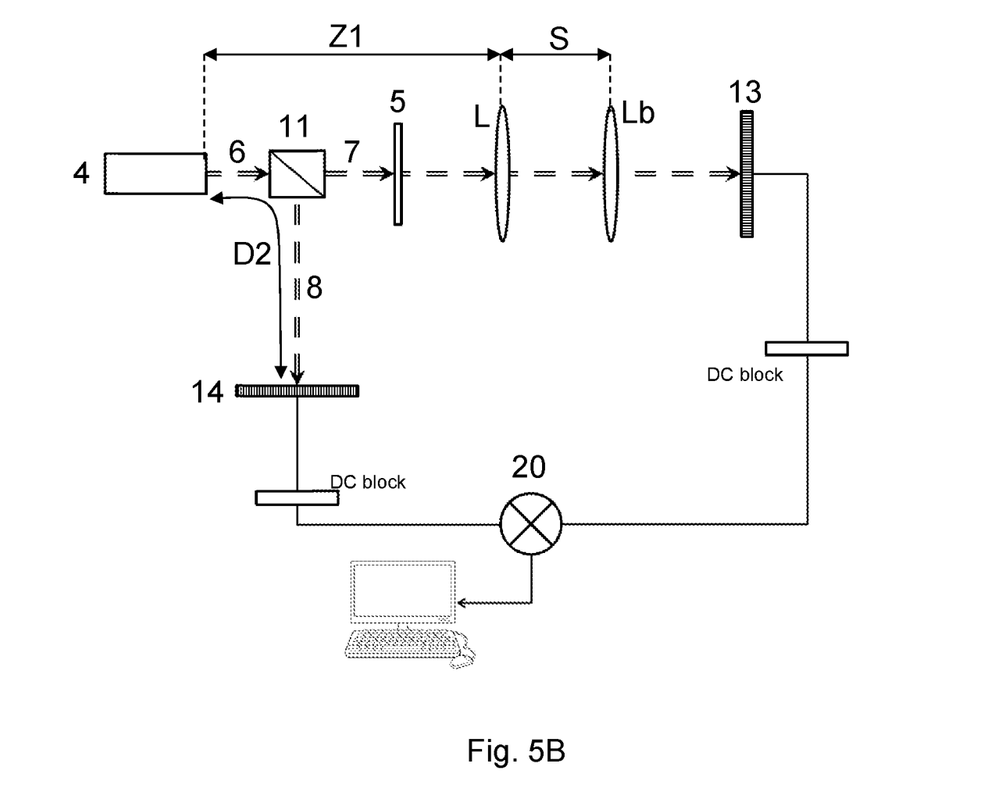

FIGS. 5A and 5B show further embodiments wherein the use of a source of entangled photons as a light source 4 is contemplated. Thanks to such embodiments, plenoptic images with high noise-signal ratio can be obtained, for example if the light intensity of the light source 4 is to be minimized. In these embodiments, in which the light source 4 emits entangled photons, the splitting element 11 could be a dichroic mirror. Such embodiments require an additional lens L which can be arranged either along the optical path of the second light beam 8 between the splitting element 11 and the second sensor 14 (in addition to or in place of the second lens La shown in FIG. 3 and in FIG. 4) or along the optical path of the first light beam 7 between the splitting element 11 and the first sensor 13.

If the additional lens L is arranged in the optical path of the first light beam 7 (as schematically shown in FIG. 5A), the lens L must be arranged so as to meet the following equation:

$$1/S + 1/S' = 1/F \quad \text{Eq.3}$$

where S is substantially equal to the length of the optical path D1 between the light source 4 and the main focal lens Lb, added to the length of the optical path Z2 between the light source 4 and the additional focal lens L (S=D1+Z2); S' is substantially the length of the optical path between the additional focal lens L and the second sensor 14; and F is the focal length of the additional focal lens L.

If the additional lens L is arranged in the optical path of the second light beam 8 (as schematically shown in FIG. 5B), the lens L must be arranged so as to meet the following equation:

$$1/S + 1/S' = 1/F \quad \text{Eq.4}$$

Where S is substantially equal to the length of the optical path between the main focal lens Lb and the additional focal lens L (which can be irrelevantly arranged before or after the object 5); S' is substantially equal to the length of the optical path Z1 between the light source 4 and the additional focal lens L, added to the length of the optical path D2 between the light source 4 and the second sensor 14 (S'=Z1+D2); and F is the focal length of the additional focal lens L.

By the plenoptic capture CPI process according to the present invention, each pixel of the angular-measure capturing sensor 14 can be correlated, by means of the correlating device 20, with the entire pixel array of the spatial-measure capturing sensor 13. This correlation allows the plenoptic image of the target scene to be reproduced. In other words the images, one per each pixel of the angular-measure capturing sensor 14, are all together correlated with the pixel array of the spatial-measure capturing sensor 13, thus providing the plenoptic image which can be subject to the following step of image processing.

It is specified that "correlate the pixels" means processing the light intensity that they captured by means of a correlation algorithm whose input are the pixels to be correlated and whose output is the correlated element, i.e. the plenoptic image, as expressed by a correlation function, as will be better explained hereafter.

It is further specified that each pixel of the spatial-measure capturing sensor 13 can be further correlated, by means of the correlating device 20, with the entire pixel array of the angular-measure capturing sensor 14.

The correlator can be, for example, a standalone electronic device, a so-called "frequency mixer", or it can be obtained by a computer software.

If the source 4 emits entangled photons, the measure of the correlation between light intensities measured by the pixels of the sensors 13 and 14 can be replaced by the coincidence measure obtained by appropriate electronic devices for measuring coincidences.

Referring to FIGS. 2, 3, 5A and 5B, advantageously, the device according to the present invention can comprise DC blocks adapted to clip the continuous component, i.e. the average value of intensities measured by each pixel of the two sensors 13, 14. DC blocks are useful for reducing the noise of the correlation measure. Thanks to the DC blocks, instead of measuring the correlation between the light intensities measured by the sensors 13 and 14 (which have an approximately constant average value and wide fluctuations around the average value), the correlation between the fluctuations of the intensities measured by sensors 13 and 14 (representing the useful part of the final signal) can be directly measured.

For example, the DC blocks can be electronic devices (filters) or they can be embedded in the measuring apparatus (for example, AC coupling of an oscilloscope) or can be implemented via software.

The process for the plenoptic capture of images according to the present invention allows the user to select the plane of the focused scene and the depth of field after the capture of the image, during a step of processing spatial and angular measures, thereby providing either a three-dimensional reconstruction of the scene or the making of one or more views of the same scene after the capture of the single image.

Furthermore, by the device CPI for the plenoptic capture of images according to the present invention, high resolution of the captured images can be obtained, the existing dependence between spatial and angular resolutions can be decoupled, and images having the maximum resolution allowed by the diffraction limit can be obtained.

According to the present invention, thanks to the spatio-temporal correlation between the two sensors 13 and 14, the inverse proportionality constraint (Eq.1) between the angular and spatial resolutions in a given image can be overcome.

From a theoretical point of view, in fact, the correlation between two measures can be described by a Glauber correlation function G $(\rho_a, \rho_b, t_a, t_b)$, where $\rho_a$ is a vector denoting the position of a pixel on the second angular-measure capturing sensor 14, $\rho_b$ is a vector denoting the position of a pixel on the first spatial-measure capturing sensor 13, $t_a$ denotes the time in which the signal has been captured by the pixel at position $\rho_a$ of the sensor 14, $t_b$ denotes the time in which the signal has been captured by the pixel at position $\rho_b$ of the sensor 13. For example, in the case of chaotic light source 4, the spatial part of the correlation function is reduced as follows: $G(\rho_a,\rho_b)=I_a(\rho_a)I_b(\rho_b)+\Gamma(\rho_a,\rho_b)$ where $I_a$ and $I_b$ are respectively the intensities measured on the pixels at positions $\rho_a$ and $\rho_b$ of the two sensors 14 and 13 shown in FIGS. 2 and 3, and do not contain any information about the correlation between the two measures; $\Gamma(\rho_a,\rho_b)$ denotes the plenoptic correlation function of the captured image and can be experimentally measured by means of an AC coupling, and the subsequent multiplication, of the signals captured by the sensors 13 and 14. More in detail, in the embodiment shown in FIG. 2, for example, the correlation function $\Gamma(\rho_a,\rho_b)$ can be expressed as follows, according to the equation 5

$$\Gamma(\rho_a, \rho_b) = \left| \int d^2\rho_0 d^2\rho_l A(\rho_0) P(\rho_l) e^{ik\left[\left(\frac{1}{S2}-\frac{1}{S2^*}\right)\frac{\rho_l^2}{2} - \left(\frac{\rho_0}{S1}+\frac{\rho_b}{S2}\right)\cdot\rho_l + \frac{\rho_0\cdot\rho_a}{S1}\right]} \right|^2 \quad \text{Eq. 5}$$

where $\rho_0$ and $\rho_1$ respectively are vectors in the transverse plane of the object 5 of the scene and in the transverse plane of the main focal lens Lb, $A(\rho_0)$ is the "Aperture" function describing the object 5 of the scene, $P(\rho_1)$ is the "Pupil" function of the main focal lens Lb, and $k=2\pi/\lambda$, and S2* is equal to $(1/f-1/S1)^{-1}$.

For the sake of simplicity, it has been assumed that the light source 4 does not actually act as additional aperture, i.e. the light propagation directions are determined only by the transmission functions of the object 5 and the main focal lens Lb.

The square modulus shown in the equation 5 (Eq.5) indicates that the correlation plenoptic image obtained at a fixed $\rho_b$ is coherent and can therefore be used to represent complex Aperture functions.

By maintaining S2=S2* and integrating the correlation function $\Gamma$ throughout the domain given by the second sensor 14, the incoherent image $\Sigma_f(\rho_b)$ is obtained on the first sensor 13, as reported according to equation 6.

$$\sum_f (\rho_b) = \int d^2\rho_a \Gamma(\rho_a, \rho_b) = \quad \text{Eq. 6}$$
$$\left(\frac{2\pi}{k}M_s z_b\right)^2 \int d^2\rho_0 |A(\rho_0)|^2 \left| \int d^2\rho_0 P(\rho_l) e^{-ik\left(\frac{\rho_0}{S1}+\frac{\rho_b}{S2}\right)\cdot\rho_l} \right|^2$$

The incoherent image coincides with the first-order image of the object 5 obtained by the main focal lens Lb, whose point scattering function is defined by the Fourier transform of the Pupil function.

Therefore, thanks to the present invention, it is possible not only the real-time monitoring of the object 5 of the scene by means of the first sensor 13 on which the first-order image of the object 5 is reproduced but also, at the same time, the capture of plenoptic images of the same object 5 by carrying out the measurement of correlation between the first-order image of the object 5 detected by the first sensor and the ghost image of the main focal lens Lb detected by the second sensor 14.

Furthermore, according to the present invention, the one-to-one correspondence between the points of the main focal lens Lb and the points of the second angular-measure capturing sensor 14 to capture the scene ($\rho_a=\rho_l$) can only be limited by light diffraction at the object. In particular, in the embodiment shown in FIG. 2, for example, the values of the resolution of the spatial and angular measures of the image are defined as shown in equations 7a and 7b.

$$\Delta\rho_b \sim \frac{\lambda S1}{D_l}, \Delta\rho_a \sim \frac{\lambda S1}{d} \quad \text{Eq. 7a and 7b}$$

In particular, the equation 7a shows how proportionality links the diffraction limit on the spatial measure of the image $\Delta\rho_b$, the wave length $\lambda$, the length S1 of the optical path between the main focal lens Lb and the object 5, and the diameter ($D_l$) of the main focal lens Lb. The equation 7b shows how proportionality links the diffraction limit on the angular measure of the image $\Delta\rho_a$, the wave length $\lambda$, the length S1 of the optical path between the main focal lens Lb and the the object 5, and the finest detail of the object d.

Therefore, assuming that the diffraction effects are negligible, the two resolutions are completely decoupled. This result, according to the present invention, allows the plenoptic capture of images, i.e. the capture of both spatial and angular measures of the image, thereby obtaining the highest possible resolution allowed, i.e. a resolution limited only by the phenomenon of diffraction.

On the basis of what stated hereinabove, the relationship between the spatial resolution $N_x$ and the angular resolution $N_u$, according to the present invention, can be expressed by the law of linearity given in equation 8, in which $N_{tot}$ denotes the total resolution, sum of the resolutions of each sensor 13,14 of the plenoptic device according to the invention.

$$N_{tot}=N_x+N_u \quad \text{Eq.8}$$

According to the linear relation expressed in equation 8, being $N_{tot}$ a fixed value of the maximum total resolution of the device, the spatial resolution $N_x$ linearly decreases as the angular resolution $N_u$ increases.

Figure 6:
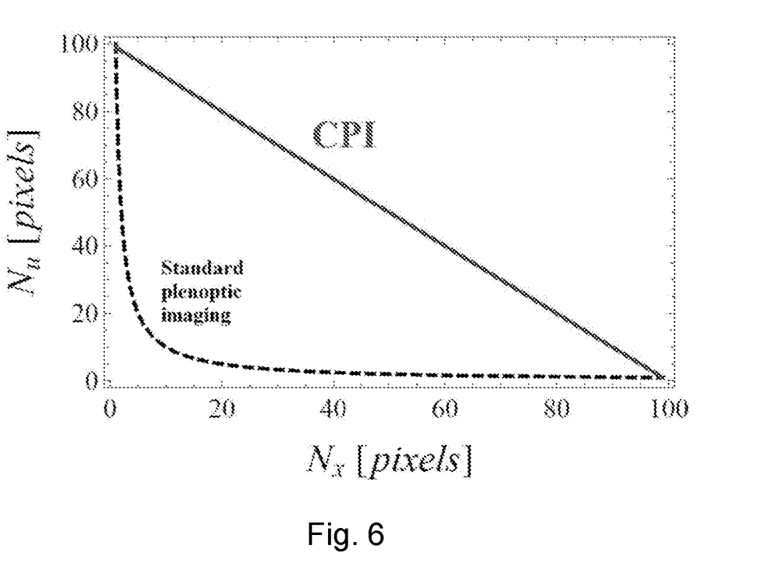
FIG. 6 shows a graph describing the pattern of the angular resolution $N_u$ as a function of the spatial resolution $N_x$ of a given image captured by a total resolution sensor $N_{tot}$, both in the case of a conventional plenoptic capturing device (dotted line) and in the case of a plenoptic capturing CPI device (solid line).

In particular, the graph shown in FIG. 8 is obtained by comparing the inverse proportionality shown in equation 1 with the linear relation shown in Equation 6. The graph of FIG. 6 shows the pattern of the angular resolution of the image $N_u$ as a function of the spatial resolution of the image $N_x$, both expressed by number of pixels. In particular, it can be seen how the (dashed) inverse proportionality line, typical of currently known plenoptic devices, highly limits $N_u$ the angular resolution of the image even in the region defined by limited spatial resolution of the image $N_x$. On the contrary, the linear relation (solid line) according to the present invention allows the preservation of an angular resolution of the image $N_u$ always greater with respect to the previous case, for each value of the spatial resolution of the image $N_x$, and therefore provides a sufficiently high angular resolution of the image $N_u$ even in the region defined by high spatial resolution of the image $N_x$.

According to a further aspect of the present invention, the microlens array 2 used in currently known plenoptic devices as shown in FIG. 1, is replaced by a single lens Lb having a given focal length f. In particular, due to the size of the sensor 3 (used in currently known plenoptic devices) dedicated to the spatial measure of the scene, the images of the main lens produced by the microlens array must have a magnifying ratio M<<1. This solution adopted in the plenoptic devices of the known art results in a poor resolution of the angular measure, i.e. the measure of the direction of the light beams of the scene. In general, in these devices, the angular resolution $N_u$ is selected in the range of 9 to 12 pixels per side. Since the depth of field of a plenoptic system corresponds to the angular resolution, the limit on the angular resolution causes a limit on the depth of field of the captured image. On the contrary, in the CPI device according to the present invention, the ghost image of the main focal lens Lb is characterized by magnification M=1 or, if there is the second focal lens La, by any magnification ratio M. What above stated applies to the embodiments of FIG. 2 and FIG. 3. In the diagram of FIG. 4, the image of the light source is produced only by the second focal lens La, and is therefore still characterized by any magnification ratio M=1. The same applies to the embodiments of FIG. 5A and FIG. 5B, wherein the ghost image of the main lens Lb produced by the additional focal lens L is still characterized by any magnification ratio M. In particular, it is always possible to choose a magnifying power M≥1. For this reason, the resolution of the angular measure can be much greater than the angular resolution of the currently known plenoptic devices, thus greatly increasing the possibility of extending the depth of field of an image captured by means of the CPI process for the plenoptic capture of images, according to the present invention.

According to another aspect of the present invention, an image processing method of focal rescaling, which allows an image previously captured outside the focal plane to be focused, is described. In this case, knowing the propagation direction of the light beams of the scene, the focal plane of the scene can be selected after the capture of the image. In other words, by focal rescaling, a non-focused captured image can be recovered in order to conform it to an image captured under the conditions where S2=S2*.

This result can be mathematically shown by considering a rescaling correlation function Γ as shown in the equation 9.

$$\Gamma(\rho_a, \rho_b) \sim |P(\rho_a)|^2 \left| A \left[ \frac{S1}{S2} \left( -\rho_b + \left(1 - \frac{S2}{S2^*}\right) \rho_a \right) \right] \right|^2 \quad \text{Eq. 9}$$

Starting from the rescaling correlation function, the expression of the rescaled incoherent image can be obtained by integrating the expression shown in equation 9.

$$\sum\nolimits_{ref} (\rho_b) = \int d^2\rho_a \Gamma\left[\rho_a, \frac{S2}{S2^*}\rho_b + \left(1 - \frac{S2}{S2^*}\right)\rho_a\right] \quad \text{Eq. 10}$$

The result of the described integration, shown in equation 10, indicates the ability of the rescaling process, allowed by the CPI process for the plenoptic capture of images according to the present invention, to focus plenoptic images in an extended domain of the depth of the field of the captured scene.

Figure 7A:
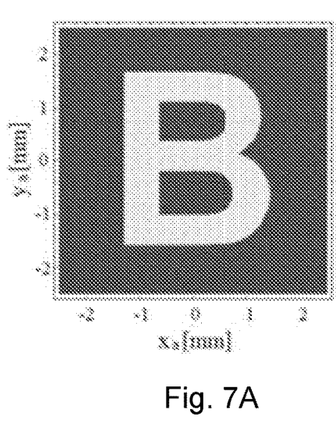
FIG. 7A shows the simulation of an image captured according to the process and by means of the device of the present invention, in which the image object is placed on the focal plane.
Figure 7B:
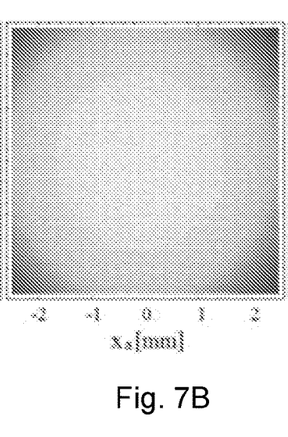
FIG. 7B shows the simulation of an image captured according to the process and by means of the device of the present invention, in which the image object is placed outside the focal plane.
Figure 7C:
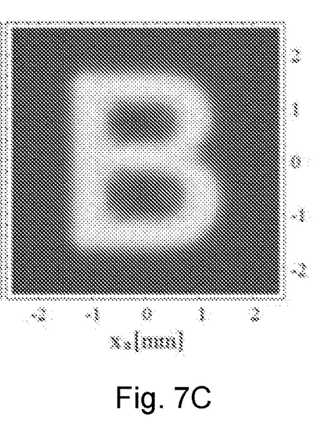
FIG. 7C shows the simulation of an image captured according to the process and by means of the device of the present invention, in which the image object is placed outside the focal plane, as in FIG. 7B. The captured image is processed again and focused by means of a focal rescaling procedure, still according to the present invention.

By way of example, it is possible to show an application result of the CPI process for the plenoptic capture of images according to the present invention. As shown in FIGS. 7A-7C, by a processing method following the capture of the image, called focal rescaling of the image, the image, in this case constituted by a light letter B on a dark background, can be focused through the capture of the spatial and angular measures of the image.

In the focal rescaling process, the position of the focal plane of the image can be determined, thereby being able to compare the result with the captured image having the proper focal distance, as shown in FIG. 7A. In particular, FIG. 7A shows the image in which the object (letter B) is located at a distance from the lens Lb, so that the length of the light's optical path between the object 5 and lens Lb (S1) and the length of the light path between the lens Lb and the first spatial-measure capturing sensor 13 (S2=S2*) is such as to meet Eq.2, so that the image of the object is focused, as provided by Eq.6. On the other hand, the length of the light's optical path between the light source 4 and the second angular-measure capturing sensor 14 is equal to the length of the light's optical path between the light source 4 and the main focal lens Lb. FIG. 7B shows the image obtained when the same object is moved out of the focus plane (the distances S1 and S2 no longer meet Eq.2), whereby the image of the object is out-of-focus and the object is unrecognizable. FIG. 7C shows the same image as FIG. 7B, to which the refocusing algorithm of Eq.9 was applied, so as to obtain the refocused image, as provided by Eq.10.

These results were obtained by using a main focal lens Lb with a diameter of 0.9 mm and a chaotic light source 4 having wavelength of 800 nm.

It should be noted that in case of the embodiment shown in FIG. 4, the correlation function $\Gamma(\rho_a,\rho_b)$ can be expressed for example as follows, according to equation 11.

$$\Gamma(\rho_a, \rho_b) = \left| \int d^2\rho_0 d^2\rho_l A(\rho_0) P(\rho_l) e^{ik\left(\varphi(\rho_0,\rho_1,\rho_b) + \frac{\rho_0 \cdot \rho_a}{MS z_b}\right)} \right|^2 \quad \text{Eq. 11}$$

with $$\varphi(\rho_0, \rho_1, \rho_b) = \frac{\rho_l^2}{2}\left(\frac{1}{S2} - \frac{1}{S2^*}\right) + \frac{\rho_0^2}{2}\left(\frac{1}{z_b} + \frac{1}{S1}\right) - \left(\frac{\rho_0}{S1} + \frac{\rho_b}{S2}\right) \cdot \rho_l$$

where Ms=T2/T1 is the magnification of the second focal lens La (in which T1 is the length of the optical path between the light source 4 and the additional focal lens L and in which T2 is substantially the length of the optical path between the additional focal lens L and the second sensor 14), M=S2/S1 is the magnification of the main Lb focal lens, $\rho_0$ and $\rho_1$ are vectors in the transverse plane of the object 5 of the scene and in the transverse plane of the main focal lens Lb, respectively, $A(\rho_0)$ is the "Aperture" function that describes the object 5 of the scene, $P(\rho_1)$ is the "Pupil" function of the main focal lens Lb, and k=2π/λ, and S2* is equal to $(1/f-1/S1)^{-1}$.

It can be noticed that the aperture of the main focal lens Lb univocally determines the resolution of the first-order image of the object; however, in the second-order image, both the light source and the second lens La can act as additional pupils by selecting the directions of the radii contributing to accumulate correlations. The above result was obtained by assuming that the image resolution of the object is defined, also at the second-order, only by the aperture of the main focal lens Lb. As a result, the second focal lens La is considered limited only by diffraction and the source is so big that it does not affect the propagation of the beams emitted by the source and passing through the lens.

By maintaining S2=S2* and integrating the correlation function Γ throughout the domain given by the second sensor 14, the incoherent image $\Sigma_f(\rho_b)$ is obtained on the first sensor 13, as reported according to equation 12.

$$\Sigma(\rho_a) = \int d^2\rho_b \Gamma(\rho_a, \rho_b) = \quad \text{Eq. 12}$$

$$\left(\frac{2\pi}{k} M_s z_b\right)^2 \int d^2\rho_0 |A(p_0)|^2 \times \left| \int d^2\rho_l P(\rho_l) e^{ik[-(\frac{\rho_0}{S1} + \frac{\rho_b}{S2})\rho_l]} \right|^2$$

In the broader scenario, $\Gamma(\rho_a,\rho_b)$ includes the required plenoptic properties that allow the out-of-focus objects to be refocused; in fact, in the geometric optics limit ($\lambda \to 0$), it is:

$$\Gamma(\rho_a,\rho_b) \sim |A(\bar{\rho}_0(\rho_a,\rho_b))|^2 |P(\bar{\rho}_l(\rho_a,\rho_b))|^2$$

where $\bar{\rho}_0$ and $\bar{\rho}_l$ are stationary points of the phase which appear under the original integral.

In the focused case, $\bar{\rho}_0 = -(S1/S2^*)\rho_b$, as provided, and the integration on $\rho_a$ gives the standard image, as shown in the equation 13.

$$\Sigma(\rho_b;S^*) \sim |A(-(S1/S2^*)\rho_b|^2 \quad \text{Eq.13}$$

If the object is out of focus, $\bar{\rho}_0$ becomes dependent on both $\rho_b$ and $\rho_a$. Therefore, if integrated on $\rho_a$ in order to increase the signal-to-noise ratio and obtain an incoherent image, the one-to-one correspondence between the points on the object plane and the points on the detector plane is lost and the image is out of focus.

However, measuring the function $\Gamma(\rho_a,\rho_b)$ provides access to both $\bar{\rho}_0$ and $\rho_l$; in this case, the out-of-focus image can be refocused by applying the following refocusing algorithm:

$$\sum_{ref}(S2) = \int d^2\rho_a \Gamma(\rho'_a, \rho'_b) \sim \left| A\left(-\frac{S1}{S2^*}\rho_b\right) \right|^2$$

with $$\rho'_a = \eta(S2)\left(1 + \frac{S1(S2^* - S2)}{S2 S2^*}\right)^{-1} \rho_a,$$

$$\rho'_b = \eta(S2)\left[\frac{S2}{S2^*}\rho_b - \left(1 + \frac{S2 S2^*}{S1(S2^* - S2)}\right)^{-1} \frac{S2}{M_s z_b}\rho_a\right]$$

with $$\eta(S2) = 1 - \frac{S1(S2^* - S2)}{S2 S2^*}\left(1 + \frac{S1}{z_b}\right)$$

These formulas are equivalent to Eq.10 for the embodiment of FIG. 2 and FIG. 3; both this algorithm and the one of Eq.10 are the generalization of the second-order image of the typical refocusing algorithm of standard plenoptic cameras.

The invention claimed is:

1. A process for the plenoptic capture of photographic, cinematographic, microscopic or stereoscopic images of a scene, comprising the steps of:
    splitting a primary light beam (6) coming from at least one light source (4) in a first light beam (7) and a second light beam (8) by means of a splitting element (11), wherein said at least one light source (4) is selected from a source of chaotic light or a source of entangled photons;
    directing said first light beam (7) and said second light beam (8) respectively towards first sensor means (13) to capture a spatial measure of said scene and towards second sensor means (14) to capture an angular measure of said scene, said first light beam (7) being adapted to be either reflected by said scene or transmitted through said scene, said angular measure being adapted to provide the propagation direction of said first light beam (7) reflected by said scene or transmitted through said scene, said spatial measure being adapted to provide the image of said scene,
    wherein said first light beam (7) is passed through a main focal lens (Lb) arranged along the light's optical path between said scene and said first sensor means (13),
    wherein said second light beam (8) is passed through a second focal lens (La) arranged along the light's optical path between said splitting element (11) and said second sensor means (14), wherein said second focal lens (La) is arranged so as to meet the following equation:

$1/za + 1/zb = 1/F$ where za is the length of the light's optical path between said second focal lens (La) and said light source (4), zb is the length of the light's optical path between said second focal lens (La) and said second sensor means (14), and F is the focal length of said second focal lens (La), and wherein said second focal lens (La) is designed so as to reproduce, on said second sensor means (14), the first-order image of the light source (4), and
    wherein said first sensor means (13) captures the spatial measure, and captures the first-order image of an object (5) of the scene.

2. The process according to claim 1, further comprising the step of processing said spatial measure and said angular measure both captured by said first and second sensor means (13, 14) through a process of correlating said spatial measure and said angular measure for obtaining a plenoptic image.

3. The process according to claim 2, wherein said process of correlating said spatial measure and said angular measure comprises correlating each pixel of said first sensor means (13) with at least one pixel of said second sensor means (14).

4. The process according to claim 1, wherein said first sensor means (13) and said second sensor means (14) are selected from two distinct image capturing sensors to capture images or two distinct portions of an image capturing sensor to capture images.

5. The process according to claim 1, wherein said second light beam (8) is directed onto said second sensor means (14) by means of at least one reflective element (12), and in that said first light beam (7) is directed onto said first sensor means (13) by means of at least one reflective element (12).

6. The process according to claim 1, wherein said second light beam (8) is passed through an additional focal lens (L) arranged along the light's optical path between said splitting element (11) and said second sensor means (14) so as to meet the following equation:

$1/S + 1/S' = 1/F$ wherein S is substantially equal to the length of the optical path between said at least one light source (4) and said main focal lens (Lb), added to the length of the optical path between said at least one light source (4) and said additional focal lens (L),
    S' is substantially the length of the optical path between said additional focal lens (L) and said second sensor means (14), and F is the focal length of said additional focal lens (L).

7. The process according to claim 1, wherein said first light beam (7) is passed through an additional focal lens (L) arranged along the light's optical path between said splitting element (11) and said main focal lens (Lb) so as to meet the following equation:

$1/S + 1/S' = 1/F$ wherein S is substantially equal to the length of the optical path between said main focal lens (Lb) and said additional focal lens (L), S' is substantially equal to the length of the optical path between said at least one light source (4) and said additional focal lens (L), added to the length of the optical path between said at least one light source (4) and said second sensor means (14), and F is the focal length of said additional focal lens (L).

8. The process according to claim 1, wherein said light source (4) is a source of chaotic light, the statistics and development over time of the chaotic source being known, said source of chaotic light being made by means of a coherent-light source adapted to emit a coherent-light beam and by means of a programmable device producing variations that are known but each time different in the phase and amplitude of the beam of coherent light, comprising the steps of:

emitting said first light beam (7) of chaotic light having known statistics by means of said light source (4), directing said first light beam (7) towards said first sensor means (13) to capture a spatial measure of said scene, said first light beam being adapted to be either reflected by said scene or transmitted through said scene, said spatial measure being adapted to provide the image of said scene, calculating the propagation direction of said second light beam (8) directed towards a virtual plane properly selected to capture an angular measure of said scene, said angular measure being adapted to provide the propagation direction of said first light beam reflected by said scene or transmitted through said scene, wherein said second light beam (8) is a virtual light beam, the correlation between the intensity, or the intensity fluctuation, and the intensity expected for said virtual light beam adapted to calculate the angular measure being provided by a software, and the light intensity over time that would be measured by second sensor means (14) for the angular measure, if these were placed on said virtual plane, can be calculated, wherein said first light beam (7) is passed through a main focal lens (Lb) arranged along the light's optical path between said scene and said first sensor means (13), wherein said main focal lens (Lb) is arranged so that the length of the light's optical path between said at least one light source (4) and said main focal lens (Lb) is substantially equal to the length of the light's optical path between said at least one light source (4) and said virtual plane.

9. The process according to claim 8, wherein said light source (4) comprises a source of coherent light and a spatial light modulator (SLM).

10. A device for the plenoptic capture of photographic, cinematographic, microscopic or stereoscopic images of a scene, comprising:

first sensor means (13) and second sensor means (14) to capture images, at least one splitting element (11) adapted to split a primary light beam (6) coming from at least one light source (4) in a first light beam (7) directed towards said first sensor means (13) and a second light beam (8) directed towards said second sensor means (14), said first light beam (7) being adapted to be reflected by said scene or transmitted through said scene, wherein said at least one light source (4) is selected from a source of chaotic light or a source of entangled photons;

said first sensor means (13) being designed to capture a spatial measure adapted to provide the image of said scene, said second sensor means (14) being designed to capture an angular measure adapted to provide the propagation direction of said first light beam (7) reflected by said scene or transmitted through said scene, a main focal lens (Lb) arranged along the optical path of said first light beam (7) between said scene and said first sensor means (13), a second focal lens (La) arranged along the optical path of said second light beam (8) between said splitting element (11) and said second sensor means (14), wherein said second focal lens (La) is arranged so as to meet the following equation:

$$1/za+1/zb=1/F$$

where za is the length of the light's optical path between said second focal lens (La) and said light source (4), zb is the length of the light's optical path between said second focal lens (La) and said second sensor means (14), and F is the focal length of said second focal lens (La), and wherein said second focal lens (La) is designed so as to reproduce, on said second sensor means (14), the first-order image of the light source (4), and wherein said first sensor means (13) captures the spatial measure, and captures the first-order image of an object (5) of the scene.

11. The device according to claim 10, wherein said first sensor means (13) and said second sensor means (14) are selected from two distinct image capturing sensors to capture images or two distinct portions of an image capturing sensor to capture images.

12. The device according to claim 10, further comprising at least one reflective element (12) adapted to direct said second light beam (8) towards said second sensor means (14), and/or at least one reflective element (12) adapted to direct said first light beam (7) towards said first sensor means (13).

13. The device according to claim 10, comprising an additional focal lens (L) arranged along the optical path of said second light beam (8) between said splitting element (11) and said second sensor means (14) so as to meet the following equation:

$$1/S+1/S'=1/F$$

wherein S is substantially equal to the length of the optical path between said at least one light source (4) and said main focal lens (Lb), added to the length of the optical path between said at least one light source (4) and said additional focal lens (L), S' is substantially the length of the optical path between said additional focal lens (L) and said second sensor means (14), and F is the focal length of said additional focal lens (L).

14. The device according to claim 11, comprising an additional focal lens (L) arranged along the optical path of said first light beam (7) between said splitting element (11) and said main focal lens (Lb) so as to meet the following equation:

$$1/S+1/S'=1/F$$

wherein S is substantially equal to the length of the optical path between said main focal lens (Lb) and said additional focal lens (L), wherein S' is substantially equal to the length of the optical path between said at least one light source (4) and said additional focal lens (L), added to the length of the optical path between said at least one light source (4) and said second sensor means (14), and F is the focal length of said additional focal lens (L).

15. The device according to claim 10, wherein said light source (4) is a source of chaotic light, the statistics and development over time of the chaotic source being known, said source of chaotic light being made by means of a coherent-light source adapted to emit a coherent-light beam and by means of a programmable device producing variations that are known but each time different in the phase and amplitude of the beam of coherent light, wherein said light source (4) is designed to emit a first beam (7) of chaotic light having known statistics, first sensor means (13) to capture a spatial measure of said scene, said first light beam (7) being adapted to be either reflected by said scene or transmitted through said scene, said spatial measure being adapted to provide the image of said scene, said device further comprising means to calculate the spatio-temporal propagation of a second light beam (8) directed towards a virtual plane to capture an angular measure of said scene, said angular measure being adapted to provide the propagation direction of said first light beam (7) either reflected by said scene or transmitted through said scene, wherein said second light beam (8) is a virtual light beam, the correlation between the intensity, or the intensity fluctuation, and the intensity expected for said virtual light beam adapted to calculate the angular measure being provided by a software, and the light intensity over time that would be measured by second sensor means (14) for the angular measure, if these were placed on said virtual plane, can be calculated.

16. The device according to claim 15, wherein said light source comprises a source of coherent light and a spatial light modulator (SLM).

* * * * *